J. B. BARTHOLOMEW.
BRAKE MECHANISM FOR MOTOR VEHICLES.
APPLICATION FILED DEC. 18, 1908.
1,086,801.
Patented Feb. 10, 1914.
3 SHEETS—SHEET 3.
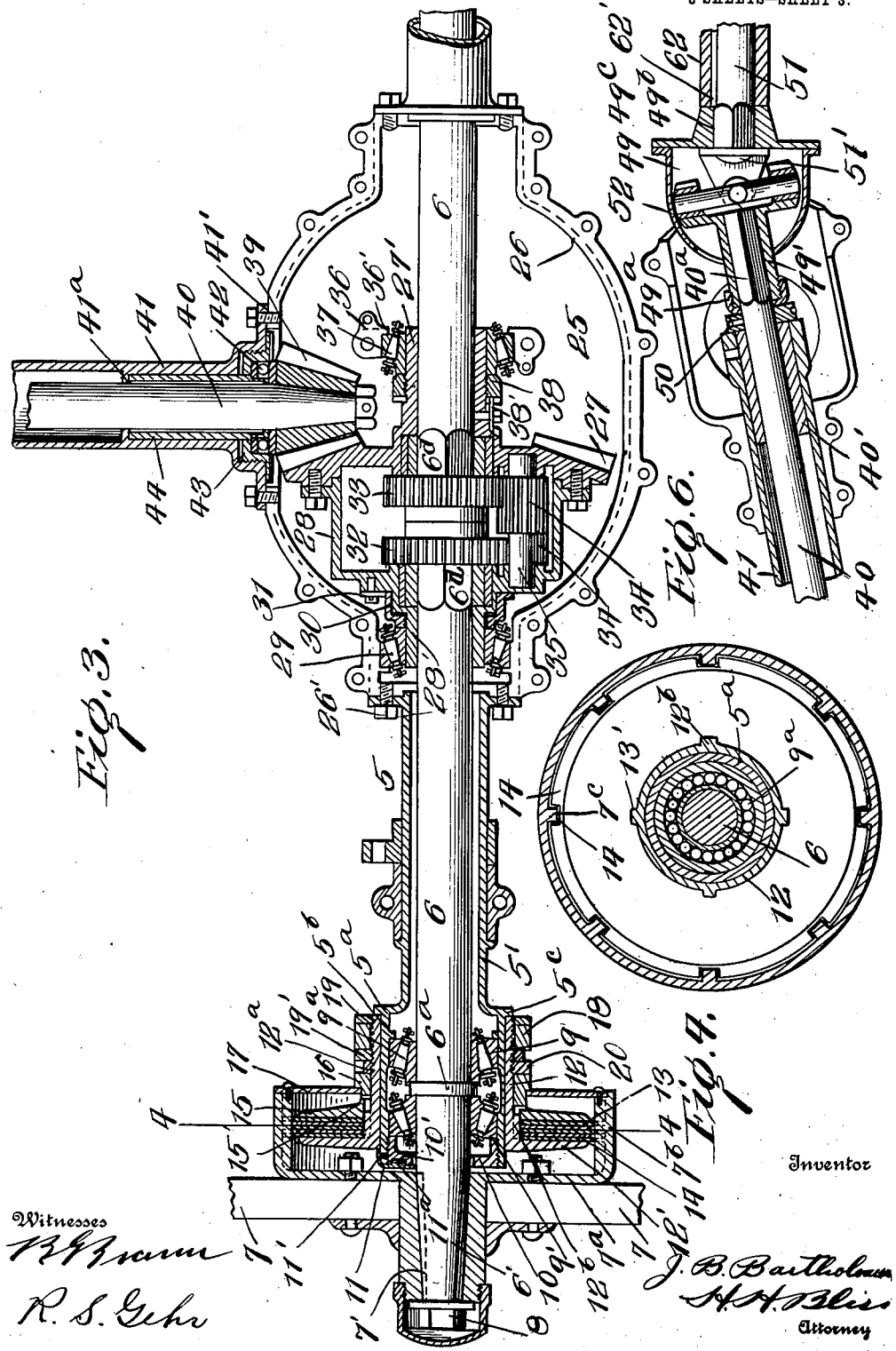

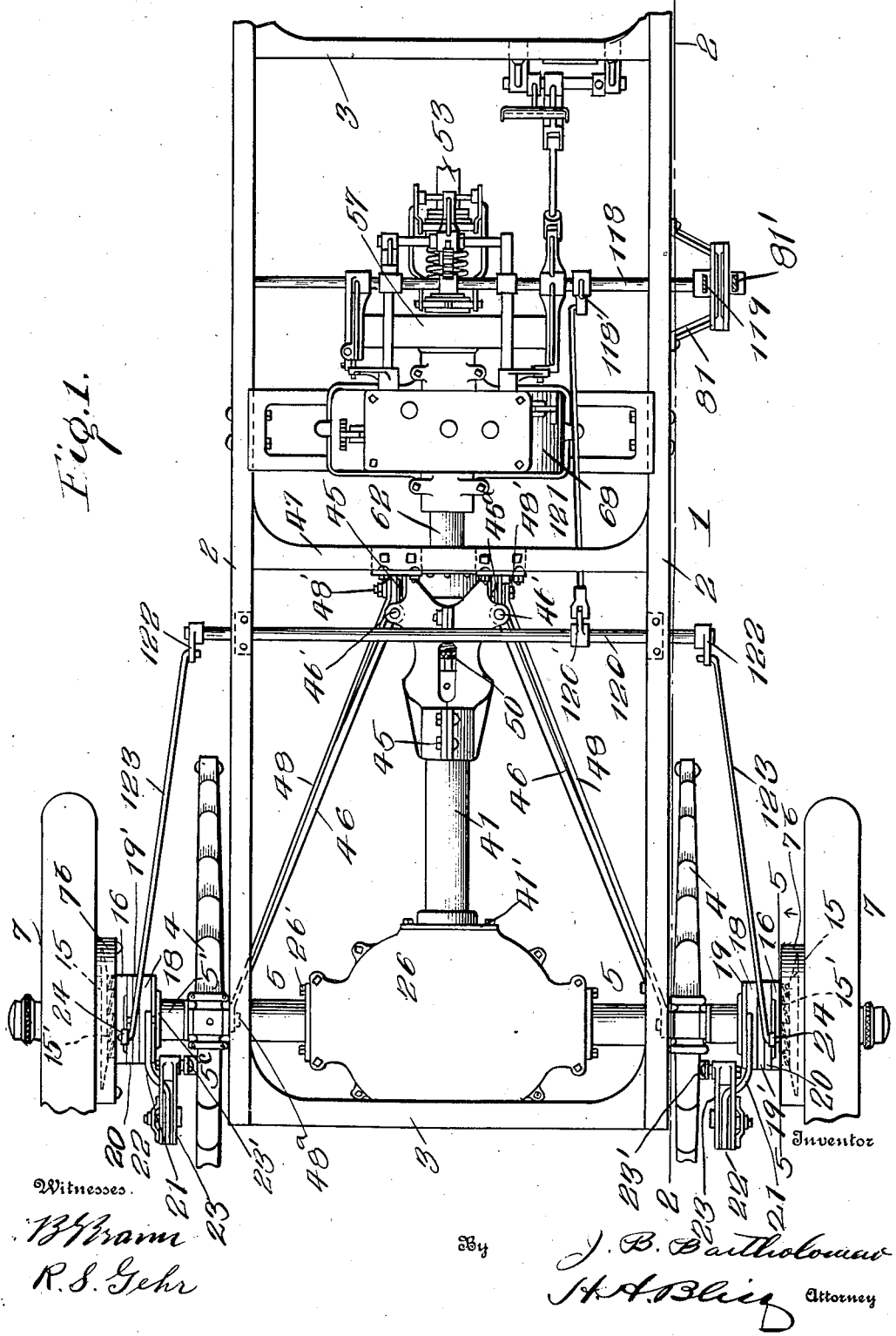

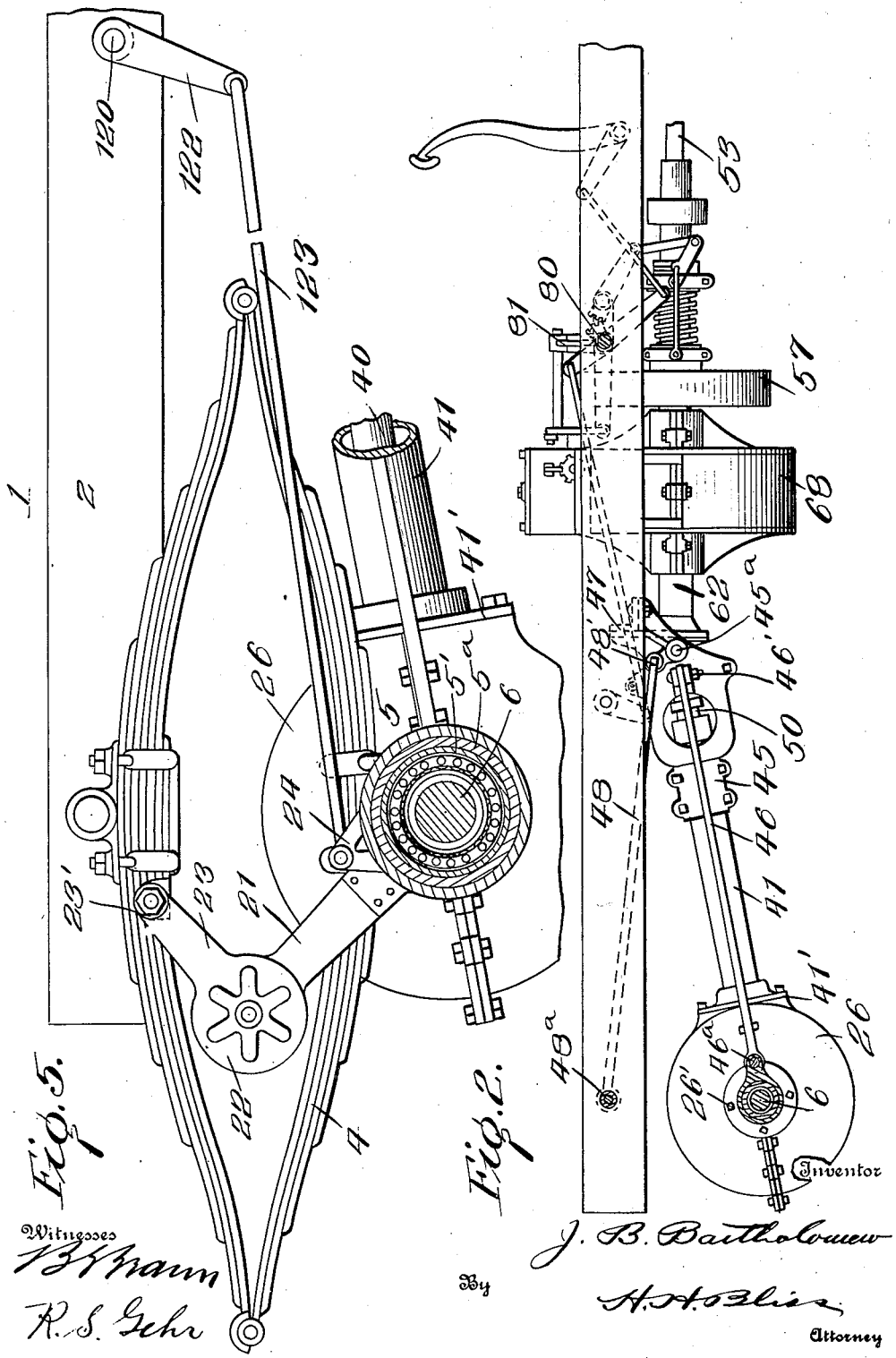

UNITED STATES PATENT OFFICE.

JOHN B. BARTHOLOMEW, OF PEORIA, ILLINOIS, ASSIGNOR TO THE BARTHOLOMEW COMPANY, A CORPORATION OF ILLINOIS.

BRAKE MECHANISM FOR MOTOR-VEHICLES.

1,086,801.  Specification of Letters Patent.  Patented Feb. 10, 1914.

Original application filed July 28, 1906, Serial No. 328,168. Divided and this application filed December 18, 1908. Serial No. 468,185.

*To all whom it may concern:*

Be it known that I, JOHN B. BARTHOLOMEW, a citizen of the United States, residing at Peoria, in the county of Peoria and State of Illinois, have invented certain new and useful Improvements in Brake Mechanism for Motor-Vehicles, of which the following is a specification, reference being had therein to the accompanying drawing.

This invention relates to brake mechanisms for motor vehicles.

The general object of the invention is to produce an improved form of brake.

The nature of the invention and the various objects attained will be understood from the following description in which reference is had to the accompanying drawings in which, Figure 1 is a plan view of a portion of a motor vehicle embodying my improvements. Fig. 2 is a section on the line 2—2, Fig. 1. Fig. 3 is a horizontal section through a portion of the rear axle. Fig. 4 is a section on the line 4—4, Fig. 3. Fig. 5 is a section on the line 5—5, Fig. 1. Fig. 6 is a vertical section through the universal joint which connects the propeller shaft with the variable speed transmission mechanism.

In the drawings 1 indicates a suitable frame which may be of any well known style or construction. I have shown it as composed of longitudinal channel bars 2—2, connected at intervals by cross bars 3—3.

As the motor and the parts transmitting power from it to the transmission gearing proper form no part of my present invention, they are not shown in the drawings and it will be understood that any well known type of motor may be employed.

At either side of its rear ends the frame is preferably supported on double elliptical springs 4—4 the lower leaf of each spring resting upon and being secured to the housing 5 for each side of the rear axle mechanism. These housings consist of a tubular portion 5' connected with or formed integral with a somewhat larger tubular portion 5ª.

6 indicates the live rear axles. These extend through the housings 5 at either side of the machine, respectively, and have their outer ends tapering as designated at 6' to receive the hub of a rear wheel 7 which is suitably keyed, as indicated at 7', to the said axle.

8 is a lock nut for securing the hub in position upon the axle.

6ª is a collar on the rear axle near its outer end. On either side of this collar are arranged roller bearings 9—9'. Preferably these bearings are of the conical roller type and have their rollers 9ª opposed to each other, as shown, so as to insure that the axle collar 6ª between them will be maintained in substantially fixed position against lateral movement, the inner bearing race of each bearing engaging with the adjacent face of the collar. The outer races of these bearings fit snugly within the enlarged portion 5ª of the axle housing, the innermost one abutting against an annular inwardly turned flange or rib 5ᵇ.

10 is an adjusting cap for the roller bearing arranged to be screwed into the outer portion 5ª of the axle housing and to have its innermost edge engage with the outer face of the outer race of the bearing 9' in such manner as to force the said bearing, the axle 6, and the bearing 9 inwardly until the latter engages the annular shoulder 5ᵇ and is in proper working position.

11 is a locking plate detachably secured by a screw 11' to the axle housing and having an inwardly turned catch-like part 11ª adapted to register with a recess 10' in the adjusting cap 10 and to hold the latter locked in proper position.

At their inner ends the hubs of the wheels 7—7 carry, and preferably have formed integrally with them, the webs 7ª having annular flanges 7ᵇ forming recesses or chambers for the wheel brakes. These brakes consist of a plurality of coöperating friction disks, some of which are connected with the wheel to rotate with it and others of which are connected to the axle housing in such manner as to prevent their angular movement, while allowing them to move longitudinally of the axle. In other words, I have interposed between the axle housing and each driving wheel a multiple disk brake.

5ᶜ is an outwardly extending shoulder on the enlarged portion 5ª of the axle casing.

12 is a sleeve snugly fitting the said enlarged portion of the axle casing and having at its outer end the annular flange 12' and having its inner end screw threaded as indicated at 12ª.

12ᵇ are longitudinally arranged lugs on the sleeve 12 adjacent to the flange 12'.

13 are friction disks fitted onto the sleeve 12 and having recesses 13' adapted to receive the lugs 12ᵇ on said sleeve.

14 are friction disks coöperating with the flange 12', the friction disks 13, and a follower 15, mounted upon the sleeve 12 and arranged to move longitudinally thereof and adapted to press the friction-retarding elements together. The friction disks 14 rotate with the wheel 7, their peripheries being notched at intervals, as indicated at 14', to receive the inwardly extending longitudinal lugs 7ᶜ on the hub flanges 7ᵇ.

16 is an annular cam plate loosely mounted upon the sleeve 12 and having its cams projecting outwardly and arranged to engage with the inwardly extending cams 15' on the follower 15 of the brake.

17 is a closing plate for the brake chamber.

18 is a collar mounted on the sleeve 12 between the nuts or washers 19, 19', which are fitted to the screw threaded end of the said sleeve and adapted to clamp the collar 18 to the said sleeve.

20 is a lock nut or washer for the nut 19'.

21 is an upwardly extending arm rigidly secured to the collar 18. At its upper end this arm carries one element of a friction shock-absorber 22, the other element of which is carried by an arm 23 which at its upper end is detachably secured at 23' to the upper part of the spring 4. The collar 18 is clamped between the washers or nuts 19, 19' in such manner as to effect a sufficient frictional resistance between the parts so that the sleeve 12 is held against rotary movement beyond a very limited amount when the brake is set and there is a tendency of the sleeve 12 to rotate with the adjacent wheel.

24 is an operating lever secured to the cam sleeve or plate 16 and extending outwardly therefrom.

25 indicates as an entirety a compensating gearing interposed between the end of the live rear driving axles. 26 is a casing for the said compensating mechanism. The inner ends of the axle housing 5 are detachably secured by the bolts 26' to the adjacent ends of the said housing or casing, the joints between these points being oil-tight.

27 is a bevel drive gear for transmitting power to the compensating gearing. It is detachably connected to a cylindrical rotary element 28 which at its outer end has a reduced tubular portion or sleeve 28' which fits snugly over the inner end of the left hand rear axle.

29 is a roller bearing preferably of the tapered roller type and having the smaller ends of the rollers disposed outwardly. 30 is a collar for adjusting the elements of the said bearing and 31 is a lock plate detachably secured to the element 28 and adapted to hold the collar 30 in the desired position of adjustment.

32, 33, are gear wheels having hubs with square holes therethrough adapted to receive the square ends 6ᵈ of the rear axles. These gear wheels mesh in a well known manner of a spur-gear compensating gear with gear wheels 34 on shafts 35, one end of each of which is loosely mounted in the bevel gear 27 and the other end is loosely mounted in the rotary element 28. The bevel gear 27 has formed integrally with it or rigidly secured thereto a sleeve 27' extending in the opposite direction from the sleeve 28' and snugly fitting the inner end of the right hand rear axle 6. Between the outer end of this sleeve 27' and bearing lugs 36 secured within the casing 26 is a roller bearing 37 of the tapered roller type and having the axes of its rollers inclined to the axis of the rear axle. The outer race of the bearing 37 is held against lateral movement outward beyond a predetermined point by the shoulders 36' on the bearing support 36.

38 is an adjusting collar for the bearing and 38' is a locking mechanism for holding the collar 38 in adjusted position. It will be noted that the entire compensating gearing mechanism is mounted between a pair of taper-roller bearings, with the rollers of the two bearings opposed to each other in such manner as to insure the holding of the compensating gearing in its proper place within its casing and to take up end thrusts thereon.

39 is a driving bevel pinion arranged to mesh with the driving bevel gear 27. This pinion is rigidly and detachably secured to the rear end of a pinion shaft 40 which extends forward through an opening in the front wall of the casing 26.

41 is a tubular casing forming a continuation of the compensating gearing casing and having its rear end detachably secured to the latter with an oil-tight joint, as indicated at 41'. The shaft 40 extends forward through this tubular casing 41 and near its rear end and immediately in front of the driving bevel 39 has a ball thrust bearing 42 interposed between the front end of the said driving pinion and the adjustable collar 43 fitted around the said shaft and having a screw threaded connection with the casing 41.

44 is a tube snugly fitting the rear end of the tubular casing 41 and bearing at its forward end against an internal shoulder 41ª in said casing. At its front end the tubular extension 41 is supported by a sleeve 45 formed in two parts separable on a longitudinal line and detachably secured together. At its front end this sleeve is expanded and connected at either side to a frame brace 46 by a pivotal connection 46', the vertical axis of which is substantially at right angles to the axis of the pinion shaft. At their rear ends these braces are pivotally connected at 46$^a$ on a horizontal axis to the adjacent axle housing 5. At its extreme front end the expanded portion of this sleeve or neck is pivotally connected at 45$^a$ on a horizontal axis transverse of the pinion shaft to a cross-brace 47. 48, 48, are frame braces pivotally connected at their forward ends on horizontal axes 48' to the said cross-brace 47 and at their rear ends to the adjacent frame sills, as indicated at 48$^a$.

49 is a universal joint arranged at the front end of the pinion shaft 40.

40' is a bushing between the front end of the casing 41 and the pinion shaft 40. The front end of the said pinion shaft is squared, as indicated at 40$^a$, and arranged to fit snugly into a squared socket 49' in the rearwardly extending portion of the universal joint 49.

49$^a$ is a cap screwed onto the rear end of the socket part 49' and 50 is a thrust bearing interposed between said cap and the front end of the casing 41.

49$^b$ is a squared socket in the front part of the universal joint 49 adapted to receive the squared end of a stub shaft 51. 51' is a lock screw for securing the said shaft 51 in proper position in said socket 49$^b$.

52 is a suitable cover for the universal joint secured at its front end to an annular flange 49$^c$ on the front socket part 49$^b$ of the universal joint. The stub shaft 51 fits within the rear end of a hollow shaft 62, being held against rotation therein by the key 62'.

53 indicates the main drive shaft which is connected at its forward end in any suitable manner with a motor, not shown. Between this shaft and the shaft 62 is a variable speed transmission mechanism comprising a clutch at 57 and a planetary gearing inclosed in the casing 68, the shaft 62 being connected with and driven by said planetary gearing.

80 is a shaft mounted transversely of the main frame in the side bars 2, thereof, and in a bearing bracket 81. A hand lever 81' is provided to rock the shaft 80 for the purpose of controlling the transmission mechanism, suitable connections between said shaft and the planetary gearing and clutch mechanism being provided for this purpose.

118 is a sleeve loosely mounted on the shaft 80 and having an operating handle 119 rigidly secured to its outer end.

118' is a rearwardly extending arm rigidly secured to the hollow shaft 118.

120 is a transversely arranged rock shaft mounted near either end in bearings carried by the longitudinal sills 2, 2, of the frame. 120' is an arm rigidly secured to the said shaft 120.

121 is a link connecting the arms 118' and 120'.

122, 122, are arms rigidly secured to the opposite ends of the shaft 120, and 123, 123 are links connecting said arms with the upper ends of the brake-operating arms 24, 24.

In operation, power is applied from the motor to rotate the main drive shaft 53 and, the transmission mechanism having been thrown into action by movement of the hand lever 81', the power is transmitted through shaft 62, universal joint 49, propeller shaft 40 and compensating gearing 25, to the live axles 6, which turn the drive wheels 7. In order to operate the wheel brakes, the operator grasps the hand lever 119 and throws it forward, thereby actuating the connections between the hand lever and the cam plates 16 in such manner as to cause the cams thereon to engage with the cams on the adjacent followers 15, forcing the latter outward and pressing the friction disks of the brakes tightly into engagement with each other.

The construction of the rear axle casing or housing and the casing or housing for the rear wheel brakes is such as to provide an oil or lubricant chamber surrounding all of the rotatable parts within said casing or housing as well as the friction disks of the brakes. This insures prolonged life of the friction plates of which the brake is made up as well as providing against the continual necessity for adjusting the brake-actuating mechanism as is the case with all friction brakes in which the frictionally engaging elements are not lubricated. Lubricant can pass from the compensating gear chambers to the brake chambers through the housing 5 and between the axles 6 and the adjusting caps 10 in the wheels or vice versa in accordance with its level within said chambers and the action of the parts thereon.

The sleeve 12 carrying the relatively stationary friction disks of the brakes is so connected to the body of the vehicle as to assist in the preventing of sudden shocks or jars thereto incident to the travel of the machine over uneven or rough surfaces, and in turn, the shock-absorbing mechanism which connects the said sleeve with the body of the vehicle serves to overcome the tendency of the sleeve to rotate with the adjacent wheel when the friction brake is applied. The connections between the sleeves 12 and the arms 21 are preferably frictional ones so as to permit of the relative movement of these parts where excessive pressure occurs between them. The diagonal braces 46 extending from the housings of the rear axles to the cross bar of the frame help to prevent side swaying of the car body in going around corners.

In the present application I make claim only to the brake mechanism and parts directly coöperating with said mechanism. Other features of the running gear herein shown are claimed in my application Serial Number 328,168, filed July 28th, 1906 for running gear for motor vehicles, of which this application is a division.

What I claim is—

1. In a motor vehicle, the combination with a running gear structure having suitable supporting and driving wheels and compensating gearing for the driving wheels, of friction brakes arranged adjacent to and adapted to oppose the rotation of each one of said driving wheels, and the oil baths for said compensating gear and for each of said brakes communicating with each other.

2. In a motor vehicle, the combination with a running gear structure having suitable supporting and driving wheels and compensating gearing for the driving wheels on the same axis, of multiple friction disk brakes arranged adjacent to and adapted to oppose the rotation of each one of said driving wheels, and the oil baths for said compensating gear and for each of said brakes communicating with each other.

3. In a motor vehicle, the combination with a running gear structure having suitable supporting and driving wheels and compensating gearing for the said driving wheels, of multiple friction disk brakes each adapted to oppose the rotation of one of said driving wheels, a housing for the said compensating gearing providing an oil bath therefor, a housing for each of said multiple disk brakes providing an oil bath for it, and housings connecting the oil baths of each brake with the oil bath of said compensating gearing.

4. In a motor vehicle, the combination with a running gear structure having suitable supporting and driving wheels and compensating gearing for the said driving wheels on the same axis, of multiple friction disk brakes each adapted to oppose the rotation of one of said driving wheels, a housing for the said compensating gearing providing an oil bath therefor, a housing for each of said multiple disk brakes providing an oil bath for it, housings connecting the oil baths of each brake with the oil bath of said compensating gearing, and means for actuating said brake.

5. In a motor vehicle, the combination with a running gear structure having a compensating gearing, rear axles connected to said compensating gearing and extending in opposite directions therefrom, and supporting and driving wheels rigidly secured to said axles, of multiple friction disk brakes each mounted on one of said axles adjacent to the driving wheel thereon and adapted to oppose the rotation of said wheel, a lubricant chamber surrounding said compensating gearing, a lubricant chamber incasing each of said brakes, and casings surrounding said axles and each connecting the lubricant chamber of said compensating gearing with the lubricant chamber of one of said brakes.

6. In a motor vehicle, the combination with a running gear structure having a compensating gearing, live axles extending laterally therefrom, housings inclosing said gearing and axles, and driving wheels rotatably mounted at the outer ends of the axle housings and connected to said axles, of multiple friction disk brakes each mounted adjacent one of the driving wheels and adapted to oppose the rotation thereof, and casings inclosing the said brakes, the compensating gearing and axle housings and the brake casings being in communication with each other and forming a continuous lubricant-holding chamber for the inclosed parts.

7. In a motor vehicle, the combination with a suitable frame, rear axle mechanism inclosed in a housing connected to said frame and driving wheels connected to said rear axle mechanism, of shock-absorbers interposed between said frame and said axle housing, multiple friction disk brakes, each brake mounted on the axle housing adjacent to one of said driving wheels and having one of its series of friction disks connected with the adjoining driving wheel, and its coöperating series of friction disks connected with an element of the adjacent shock-absorber, and means for forcing together the friction disks of each brake.

8. In a motor vehicle, the combination with a suitable frame, rear axle mechanism inclosed in a housing connected to said frame and driving wheels connected to said rear axle mechanism, of shock-absorbers interposed between said frame and said axle housing, multiple friction disk brakes, each brake mounted on the axle housing adjacent to one of said driving wheels and having one of its series of friction disks connected with the adjoining driving wheel, and its coöperating series of friction disks yieldingly connected with an element of the adjacent shock-absorber, and means for forcing together the friction disks of each brake.

9. In a motor vehicle, the combination with a running gear having suitable supporting and driving wheels, of shock-absorbers interposed between the running gear frame and the driving wheels, multiple friction disk brakes, each arranged adjacent to one of said driving wheels and having one of its series of friction disks connected with the adjoining driving wheel, and its coöperating series of friction disks connected with an element of the adjacent shock-absorber, and means for forcing together the friction disks of each brake.

10. In a motor vehicle, the combination with a running gear having suitable supporting and driving wheels, of shock-absorbers interposed between the running gear frame and the driving wheels, multiple friction disk brakes, each arranged adjacent to one of said driving wheels and having one of its series of friction disks connected with the adjoining driving wheel, and its co-operating series of friction disks yieldingly connected with an element of the adjacent shock-absorber, and means for forcing together the friction disks of each brake.

11. In a motor vehicle, the combination with a main frame and a rear axle structure having a rigid casing or frame part, driving wheels and axle, of brake devices for opposing the rotation of the wheels, each comprising a rotating part connected to the adjacent wheel and axle, a non-rotating part, and yielding connecting means between the non-rotating part and the main frame acting independently of the rear axle frame or casing to prevent rotation of the non-rotating part.

In testimony whereof I affix my signature, in presence of two witnesses.

JOHN B. BARTHOLOMEW.

Witnesses:
H. N. RICE,
M. C. DRAY.